United States Patent

Zagorskaya et al.

[15] 3,653,811

[45] Apr. 4, 1972

[54] METHOD OF REMOVING HYDROGEN HALIDES FROM SULPHUR DIOXIDE GAS

[72] Inventors: Maina Konstantinovna Zagorskaya; Alexandr Ilich Volikh, both of ulitsa Kholturiva, 5A, kv. 93, Ryazan; Lev Izrailevich Mekler, ulitsa Proletarskaya, 5, kv. 42, Karagandinskaya, Obl., Balkhash; Vladimir Ivanovich Ksenzenko, Naberezhnaza 40, kv. 46, Moscow, all of U.S.S.R.

[22] Filed: Mar. 6, 1969

[21] Appl. No.: 805,035

[52] U.S. Cl. ...................................23/2, 23/153, 23/154, 23/178, 55/71
[51] Int. Cl. .....................................C01b 17/60, C01b 17/56
[58] Field of Search.................23/2, 152, 153, 154, 177, 178, 23/178 S, 2.1; 55/71

[56] References Cited

UNITED STATES PATENTS 2,813,000  11/1957  Quittenton...........................23/153 X
2,829,028  4/1958  Aho et al. ............................23/154 X
3,016,285  1/1962  Clifford ........................................23/2
3,425,790  2/1969  Sloan......................................55/71 X
3,505,403  4/1970  Viebe..................................23/152 X

OTHER PUBLICATIONS

Helfferich, Ion Exchange, pp. 148– 151 (McGraw– Hill) 1962.
Nachod et al., Ion Exchange Technology, pp. 97– 99 (Academic Press– 1956).
Samuelson, Ion Exchange Separations in Analytical Chemistry, pp. 24, 414– 416 (John Wiley– 1963).

*Primary Examiner*—Oscar R. Vertiz
*Assistant Examiner*—Charles B. Rodman
*Attorney*—Waters, Roditi, Schwartz & Nissen

[57] ABSTRACT

A method of removing hydrogen halides from sulphur dioxide gas by absorbing said impurities with anion exchange resins in salt form.

2 Claims, No Drawings

METHOD OF REMOVING HYDROGEN HALIDES FROM SULPHUR DIOXIDE GAS

The present invention relates to methods of removing hydrogen halides from sulphur dioxide gas. The necessity of such purification arises, for example, when utilizing roaster gases of metallurgical plants smelting sulphide ores containing admixtures of halide minerals, predominantly fluorides. When sulphuric acid is produced from said roaster gases the hydrogen fluoride damages the contact mass of the catalyst and rapidly corrodes the apparatus.

Methods are known for removing hydrogen halides from sulphur dioxide gas by absorbing said impurities with sorbents.

Thus, methods are known for removing said impurities from sulphur dioxide gas which comprise scrubbing the gas with water or a dilute solution of boric acid.

A disadvantage of said methods is the large consumption of water and boric acid. Then too the dilute solutions of hydrogen halides formed cannot be utilized and there are sizable losses of sulphur dioxide due to its solubility in water.

When the gas to be cleaned has a high moisture content mists of hydrogen halide acids are formed which cannot be absorbed effectively with water or aqueous solutions.

The industrial method of removing hydrogen fluoride from sulphur dioxide gas by washing said gas with concentrated (>95 percent) sulphuric acid involves large consumption of sulphuric acid and cannot be considered satisfactory.

It is also known to remove hydrogen fluoride from sulphur dioxide gas by liquefying said gas followed by double distillation, but this method is of practical significance only for the production of pure liquid sulphur dioxide.

In addition, not one of the prior art methods makes it possible to utilize the hydrogen fluoride contained in roaster gases which often comes to several kilograms per ton of sulphur dioxide.

It is an object of the present invention to eliminate the above disadvantages.

It is a further and more specific object of the invention to provide a method of removing hydrogen halides from sulphur dioxide gas with sorbents which yields highly purified sulphur dioxide gas without loss of the same, and concentrated solutions of hydrogen halides suitable for utilization and which permits of repeated utilization of sorbents for the purification of sulphur dioxide gas.

These objects have been accomplished by the provision of a method of removing hydrogen halides from sulphur dioxide gas by absorbing said impurities with anion exchange resins in the salt form.

A preferred embodiment of the invention contemplates the use of anion exchange resins of strong and medium basicity with functional groups of secondary and tertiary amines and quaternary ammonium bases.

Said anion exchange resins are selective sorbents of hydrogen halides from sulphur dioxide gas. Selective absorption of hydrogen halides takes place through the solvation of the functional groups of the anion exchange resins by the polar molecules of hydrogen halides and also through complex formation with the amino groups and anion of the resin. Thanks to said factors hydrogen halides are bound firmly and in large specific amounts by the anion exchange resin when said resin comes in contact with the gas to be purified, whereas sulphur dioxide is not absorbed.

Sulphur dioxide gas containing some one hydrogen halide, say HF or HCl, exclusively or predominantly, is preferably purified with an anion exchange resin in the corresponding anion form ($F^-$ or $Cl^-$), although it is possible to employ other salt forms, for example, the sulphate form.

After saturation with hydrogen halide impurities anion exchange resins are preferably regenerated by washing with water in which case the absorbed impurities go into solution.

In a layer 5–10 cm. thick said anion exchange resins in the salt form completely absorb from sulphur dioxide gas (without hydrogen halide appearing in the exit gas) 0.2 to 0.4 g. of hydrogen fluoride and 0.1 to 0.15 g. of hydrogen chloride per g. of resin, assuming the temperature of the entering gas to be 15°–30° C. The dynamic absorptive capacity of the anion exchange resins depends only slightly on the concentration of $SO_2$ and hydrogen halides and on the flow rate of the gas mixture through the exchange resin. The complete absorptive capacity of the anion exchange resins in respect to hydrogen fluoride reaches 0.6–0.7 g. per g. of exchange resin.

Of particular importance is the ability of anion exchange resins in the salt form to effectively absorb mists of hydrofluoric and hydrochloric acids, which is explained by the local elevation of the temperature of the anion exchange resin layer in the area of absorption and the consequent dissociation of the droplets of mist to form molecules of water and hydrofluoric or hydrochloric acid.

As disclosed above it is possible to regenerate anion exchange resins by washing with a small amount of water (up to 10 l./kg. of exchange resin), making it possible to withdraw from the cycle a solution containing some 10–15 wt. percent hydrogen fluoride or chloride. Water is passed through the exchange resin at the rate of 5–10 hr.$^{-1}$. The concentration of sulphite ion in the solutions of hydrogen fluoride obtained reaches 0.001–0.05 g./l. but solutions of hydrogen chloride are free of sulphite ion.

The regeneration of anion exchange resins requires approx. 1 hour.

After regeneration with water anion exchange resins fully regain their absorptive capacity in respect to hydrogen halides.

The anion exchange resins employed are resistant to gaseous hydrogen halides and sulphur dioxide and their aqueous solutions, and can be employed for an unlimited lengthy period.

The process of the present invention is illustrated in the following examples of the removal of hydrogen halides from sulphur dioxide gas by means of anion exchange resins in the salt form.

EXAMPLE 1

Into a column 45 mm. in diameter were placed 100 g. of anion exchange resin in the fluoride form which had been prepared by passing 5 percent hydrofluoric acid through a resin (polycondensation product of methylamine, phenol and formaldehyde) in the OH form. The thickness of the layer of anion exchange resin in the column was 100 mm.

Through the anion exchange resin was passed a gas mixture at a temperature of 25° C. containing 3.1 mg./l. HF, 80 mg./l. $SO_2$, 15 mg./l. $H_2O$ and the remainder, air.

The flow rate of the gas mixture was 30 l./min. and the velocity, 0.3 m./sec.

The exit gas was tested for HF (sensitivity 0.0005 mg./l. but 11.05 m.$^3$ of gas was passed through the column and 33.6 g. of HF was absorbed (16.8 mmol HF per g of ion exchange resin) before HF was detected.

Removal of hydrogen fluoride from the sulphur dioxide gas was >99.98 percent.

After hydrogen fluoride appeared in the exit gas 20 l. of clean air was passed through the ion exchange resin to displace sulphur dioxide, followed by 0.6 l. of water at a flow rate of 30 ml./min. This desorbed 32.3 g. of hydrogen fluoride, the first 300 ml. of eluate containing 29.2 g. of hydrogen fluoride, that is, 90 percent of the total amount desorbed. The sulphate-ion content of the eluate was less than 0.01 g./l.

The absorption-desorption cycle with the above charge of exchange resin and gas mixture of the same composition was repeated many times. In each cycle 16.5±0.5 mmol of HF per g. of ion exchange resin was absorbed before HF was detected in the exit gas and the same amount of HF was washed out with water.

In each subsequent cycle the final fraction of eluate from the preceding cycle with an HF content of ≈10 g./l. was used instead of the first portion of water for washing the ion exchange resin, thus withdrawing all the absorbed hydrogen fluoride in the form of a solution with an HF content of 100±10 g./l.

EXAMPLE 2

Through a column 45 mm. in diameter containing 100 g. of anion exchange resin (prepared by treating the cloromethylated copolymer of styrene and divinylbenzene with trimethylamine) in the fluoride form, was passed a gas mixture at a temperature of 25° C. containing 3.25 mg./l. HF, 80 mg./l. $SO_2$, 10 mg./l. $H_2O$ and the remainder, air.

Purification was carried out in the conditions described in Example 1.

7 m.$^3$ of gas mixture was passed through the column and 22.4 g. of HF were absorbed (11.2 mmol HF per g. of ion exchange resin) before hydrogen fluoride was detected in the exit gas.

The degree of hydrogen fluoride removal from the sulphur dioxide gas was >99.98 percent.

The ion exchange resin was regenerated as described in Example 1. When the ion exchange resin was washed with 0.6 l. of water 21 g. of hydrogen fluoride were desorbed, the first 300 ml. of eluate containing 19 g. of HF.

The absorption-desorption cycle was repeated many times, the final fractions of the eluate being returned for washing the saturated ion exchange resin. The solution withdrawn from the cycle contained 70±5 g. HF and 0.05 g. $SO_2$ per l.

EXAMPLE 3

Through a column 45 mm. in diameter containing 100 g. of anion exchange resin (prepared by the polycondensation of polyethylenediamine and epichlorohydrin) in the sulphate form was passed a gas mixture at a temperature of 25° C. containing 2.5 mg./l. HF, 43 mg./l. $SO_2$, 10 mg./l. $H_2O$ and the remainder, air.

Purification was carried out in the conditions described in Example 1.

11.6 m.$^3$ of gas was passed through the column and 29 g. HF were absorbed (14.5 mmol HF per g. of ion exchange resin) before HF was detected in the exit gas.

When the ion exchange resin was washed with 1 liter of water, 28 g. of hydrogen fluoride and approx. 0.5 g. of sulphuric acid were desorbed.

During the following cycles the ion exchange resin was gradually enriched with F$^-$ -ion exchange bonds in place of $SO_4^{2-}$ and the absorptive capacity increased to 34 g. of HF (17 mmol HF per g. of ion exchange resin) before HF appeared in the exit gas.

EXAMPLE 4

A gas mixture was purified, the composition of the mixture, the charge of the column and the conditions of purification being the same as in Example 1.

The gas mixture was passed through the column until the hydrogen fluoride content of the gas leaving the column was the same as that of the gas entering the column.

After hydrogen fluoride appeared in the exit gas, the gas mixture was absorbed in a similar column connected in series.

The ion exchange resin in the first column absorbed 62 g. of hydrogen fluoride and when washed with 0.8 l. of water 60 g. of hydrogen fluoride were desorbed, the first 300 ml. of eluate containing 170 g./l. HF.

EXAMPLE 5

Through a column 45 mm. in diameter containing 100 g. of anion exchange resin (prepared by treating the chloromethylated copolymer of styrene and divinylbenzene with trimethylamine) in the chloride form, was passed a gas mixture at 25° C. containing 3.5 mg./l. HCl, 80 mg./l. $SO_2$, 12 mg./l. $H_2O$ and the remainder, air.

Purification was carried out in the conditions described in Example 1.

3.8 m.$^3$ of gas mixture were passed through the column and 13.3 g. HCl were absorbed before HCl was detected in the exit gas (determined with a sensitivity of 0.005 mg./l.).

The degree of removal of hydrogen chloride from the sulphur dioxide gas was ≈99.9 percent.

When gas mixture was passed through the column until the concentration of HCl in the gas leaving the column was the same as that in the gas entering the column, another 2.7 g. of hydrogen chloride were absorbed.

When the ion exchange resin was regenerated by washing with 300 ml. of water 15.2 g. of hydrogen chloride were desorbed, the first 100 ml. of eluate containing 120 g./l. HCl Though the present invention has been described in accordance with a preferred embodiment it will be understood by those skilled in the art that various changes and modifications may be made in carrying out the present invention without departing from the spirit and scope thereof. These changes and modifications are to be considered as falling within the spirit and scope of the invention as defined in the appended claims.

We claim:

1. A method for the purification of a sulfur dioxide-containing gas, containing HF and/or HCl comprising removing the HF and/or HCl therefrom by absorbing same by anion exchange resins having functional groups selected from the group consisting of secondary amines, tertiary amines, quaternary ammonium bases and combinations thereof, said functional groups being in the fluoride and/or chloride form.

2. A method as claimed in claim 1, further comprising regenerating the anion exchange resins when saturated with the hydrogen halides by washing with water.

* * * * *